INVENTOR
Horst Ohnsorge
BY George H. Spencer
ATTORNEY

INVENTOR
Horst Ohnsorge
BY George H. Spencer
ATTORNEY

INVENTOR
Horst Ohnsorge

BY George H. Spencer
ATTORNEY

United States Patent Office 3,172,048
Patented Mar. 2, 1965

3,172,048

PARAMETRIC AMPLIFIER WITH PLURAL PARALLEL NONLINEAR REACTORS AND IDLER CIRCUITS

Horst Ohnsorge, Ulm (Danube), Germany, assignor to Telefunken Patentverwertungs-G.m.b.H., Ulm (Danube), Germany Filed July 31, 1961, Ser. No. 128,180
Claims priority, application Germany, Aug. 5, 1960, T 18,791
15 Claims. (Cl. 330—4.9)

The present invention relates generally to amplifiers, and, more particularly, to variable parameter or parametric amplifiers.

Parametric amplifiers, also called reactance amplifiers are based on the principle of periodically varying a nonlinear reactance, such as a capacitance or an inductance. This variation is effected by applying a periodically variable voltage or a periodically variable current to the nonlinear reactance. A nonlinear capacitance may be provided by using a biased semiconductor diode, and a nonlinear inductance may be provided for microwaves by using a ferrite. A simplified wiring diagram of a known parametric amplifier is shown in FIGURE 1. The input signal of a frequency $f_S$ is fed by signal source SS to a signal circuit SC with the natural frequency $f_{OS}$. In the disclosed embodiment, a semiconductor diode D is provided as the nonlinear reactance.

In order to control the nonlinear reactance, the pump frequency $f_P$ is fed from a source of pump voltage PS via a pump circuit PC which is tuned to $f_{OP}$. An idling circuit IC is provided between the nonlinear reactance D and the pump circuit and is tuned to a frequency $f_{OI}$. The parametric amplifier, which is distinguished by a small noise factor, may be operated in various ways. One method of operation is as a straight amplifier wherein the signal to be amplified and the amplified signal have the same frequency. In this case, the output signal is tapped from the signal circuit SC. The bandpass frequencies for the frequency determining circuits SC, PC, and IC are chosen so that the following relationship is true for these frequencies:

$$f_{OI}=f_{OP}-f_{OS}$$

Moreover, the parametric amplifier may also be used as a mixer-amplifier. In this case, the signal to be amplified and the amplified signal tapped off have a different frequency. In the device according to FIGURE 1, the output signal with the frequency $f_I$ is tapped off from the idling circuit IC. The frequencies of the various circuits have the same relationship mentioned in connection with the straight amplifier.

With the above-mentioned frequency relationships, the voltage amplification of a parametric amplifier amounts to:

$$V=\frac{1}{1+\Omega_s-\frac{\alpha}{1+jq\Omega_s}}$$

where $\alpha$ is the deattenuation constant, $-q=\Omega_I/\Omega_S$, and $\Omega_S$, $\Omega_I$ are the normalized detuning of the signal circuit and idling circuit, respectively.

If the frequency $f_S$ fed to the signal circuit is equal to the input frequency $f_{OI}$ of the signal circuit, the following relationship is obtained for the amplification:

$$V_{max}=\frac{1}{1-\alpha}$$

The magnitude of the amplification constant or deattenuation constant $\alpha$ is determined by the characteristic of the nonlinearity and of the pump energy fed. However, it may practically not exceed a cutoff value. Of course, instead of the circuits IC, SC, and PC in FIGURE 1, selective networks, such as two-terminal networks or four-terminal networks, with band-pass characteristics may be used, as shown in FIGURE 2. The ohmic resistances are for adjusting the networks. Since $\alpha$ is limited and the amplifier becomes unstable when $\alpha=1$, cascade connections for increasing the amplification in parametric amplifiers have already been suggested. In these known cascade connections, complete amplifier stages with idling networks, signal networks, and pump networks according to FIGURES 1 and 2 are arranged one after the other so that a multiplicative amplification gain is obtained.

The object of the present invention is to provide a parametric amplifier with a deattenuation constant as high as desirable for increasing the amplification or for attaining self excitation.

Another object of the invention is to provide an amplifier exhibiting a considerable gain in bandwidth as compared to the prior-art amplifiers, such as those disclosed in FIGURES 1 and 2.

These objects and others ancillary thereto are accomplished according to preferred embodiments of the invention wherein a parametric amplifier having increased amplification is obtained by providing several circuits in parallel with the signal circuit, each comprising one nonlinear reactance and one idling circuit. Also, means are provided to feed the pump frequency either to the signal circuit branch or to all of the branches lying parallel to the signal circuit branch.

Additional objects and advantages of the present invention will become apparent upon consideration of the following description when taken in conjunction with the accompanying drawings in which.

Figures 2, 3:
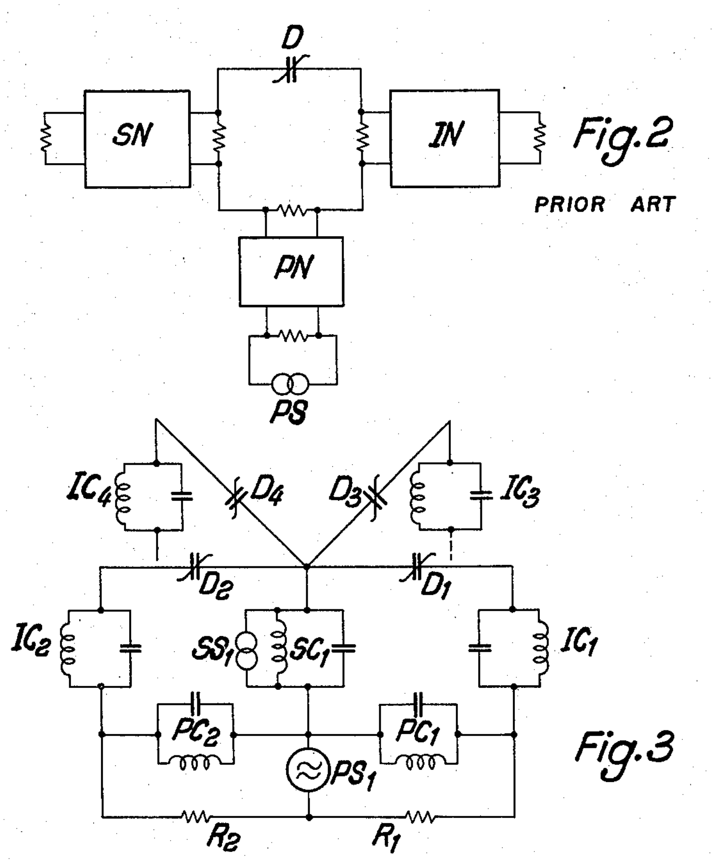
Fig.2 PRIOR ART Fig.3
FIGURE 2 is a simplified circuit diagram of another known parametric amplifier which also has been discussed above.
FIGURE 3 is a circuit diagram illustrating a portion of one embodiment of the invention.

In the embodiment of FIGURE 3, a signal source $SS_1$ and a signal circuit $SC_1$ are provided. A nonlinear reactance, which in this case is a semiconductor diode $D_1$, an idling circuit $IC_1$, and a pump circuit $PC_1$ are connected to signal circuit $SC_1$. However, several such branches are provided parallel to the signal circuit, of which only one, namely the one with the sub numeral 2 is completely shown. The other branches, of which there may be several, are only partially shown for purposes of clarity. In this embodiment, the pump frequency is fed from a pump voltage source $PS_1$ via ohmic resistances $R_1$, $R_2$, etc., to a pump circuit. It is also possible to provide several pump voltage sources whose energy may be fed directly to the individual pump circuits. Assume that all pump circuits are tuned to the same pump frequency $f_p$ and that all idling circuits are tuned to the same idling frequency $f_I$. With such an amplifier, the following amplification is obtained:

$$V=\frac{1}{1+j\Omega_S-\sum i\frac{\alpha_i}{1+jq\Omega_S}}$$

and in the center of the band $$V_{max}=\frac{1}{1-\sum i\alpha_i}$$

As will be seen, the amplification factor or deattenuation constant may be substantially larger than in the conventional parametric amplifier.

Figure 4:
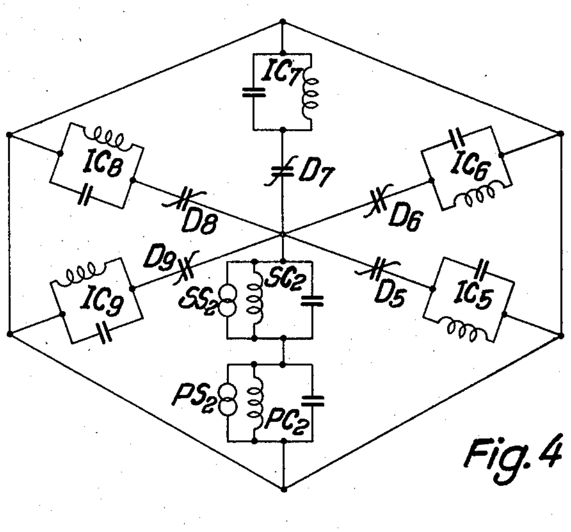
FIGURE 4 is a circuit diagram of another embodiment of the invention wherein only one pump circuit is required.

FIGURE 4 shows a further embodiment of a parametric amplifier according to the invention which has the advantage of requiring only one pump circuit. In this embodiment, a branch is formed by the series connection of the signal circuit $SC_2$ and the pump circuit $PC_2$. Again, the signal frequency is fed to the signal circuit $SC_2$ from a signal source $SS_2$ and the pump frequency $f_p$ is fed to the pump circuit $PC_2$ from a pump voltage source $PS_2$. Parallel to this branch lie two or more branches connected in parallel with this branch, each of which includes the series connection of one controllable reactance $D_5$ to $D_9$, and one idling circuit $IC_5$ to $IC_9$. Assume at first that the idling circuits are all tuned to the same frequency $f_I$. The amplification resulting in the center of the band will be:

$$V_{max}=\frac{1}{1-\sum i\alpha_i}$$

As mentioned above, it has already been proposed to cascade several parametric amplifiers. However, in this known device, several complete parametric amplifiers are necessary, whereas in the device according to the present invention only a single parametric amplifier is provided since in each case only one signal circuit and, in the case of FIGURE 4, only one pump circuit is necessary. The present invention thus differs from the known cascade connection of several parametric amplifiers in an advantageous manner by using substantially less circuitry.

Figure 5:
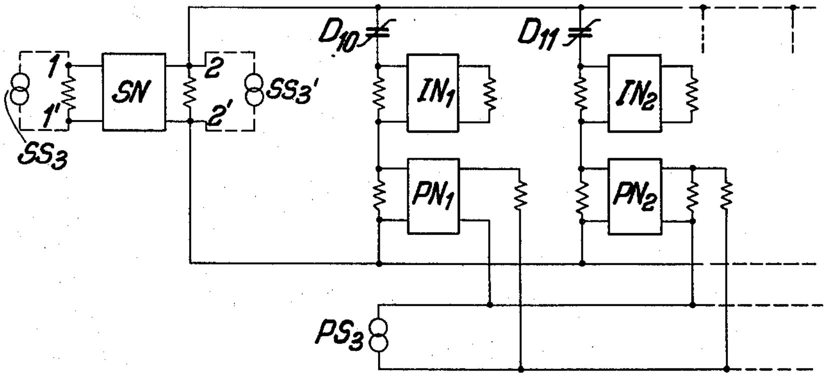
FIGURE 5 is a circuit diagram of a further embodiment similar to that of FIGURE 3, but of the selective network type.
Figure 6:
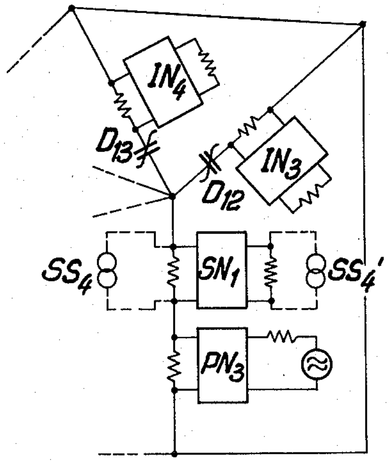
FIGURE 6 is a circuit diagram of still another embodiment similar to that of FIGURE 4, but also of the selective network type.

The amplifier according to the invention may also be operated with general selective networks SN, PN, and IN, such as two-terminal networks or four-terminal networks, as shown in FIGURES 5 and 6. When it is operated as a straight amplifier, the signal energy may be fed at the terminals 1, 1' or 2, 2', and the amplified energy may be tapped off from the terminals 1, 1' and/or 2, 2'. The remainder of the circuit according to FIGURE 5 corresponds to the circuit according to FIGURE 3 and the circuit according to FIGURE 6 corresponds to the circuit according to FIGURE 4. The ohmic resistances are for matching the frequency selective networks.

Figure 7:
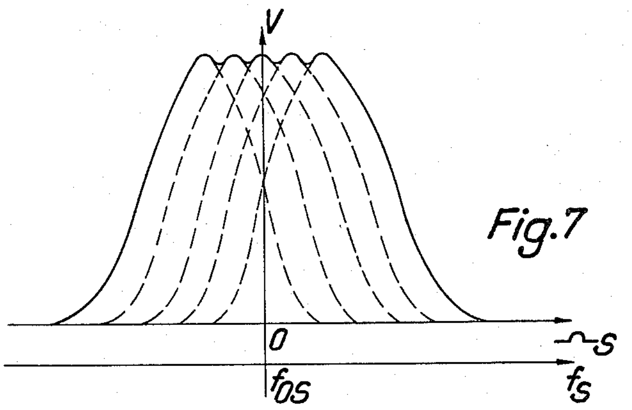
FIGURE 7 is a band-pass curve of one embodiment tuned in a special manner.

In another embodiment of the invention, a parametric amplifier is provided whose frequency bandwidth is substantially greater than that of the known parametric amplifiers. In this embodiment, all or several of the various idling circuits of FIGURES 3 to 6 provided in the parallel branches, or also the pump circuits of FIGURES 3 and 5, have their frequencies staggered in such a way that their resonance curves partially overlap. These circuits are designed so that $f_{OI}\neq f_{OP}-f_{OS}$. One of the idling circuits or one of the pump circuits may of course be tuned, just as before, to the center of the band. Thus, for this branch the relationship $f_{OI}=f_{OP}-f_{OS}$ would hold true as before. A circuit designed in this manner has a band-pass curve as shown in FIGURE 7. The various bell-shaped resonance curves, caused by the parallel branches in cooperation with the signal circuit, together result in a frequency relationship having band-pass characteristics. The amplification in this case has the relationship:

$$V=\frac{1}{1+j\Omega_S-\sum i\frac{\alpha_i}{1-j\Omega_{Ii}}}$$

$\Omega_{Ii}$ being the normalized detuning of the idling circuits.

When use is made of one pump source, one pump circuit, one idling circuit, and one nonlinearity element as the active element in each branch lying parallel to the branch comprising the signal circuit, the same characteristic as shown in FIGURE 7 may be obtained, with similarly tuned idling circuits, by choosing varying frequencies $f_{P1}\neq f_{P2}\neq f_{P3}$.

Figure 1:
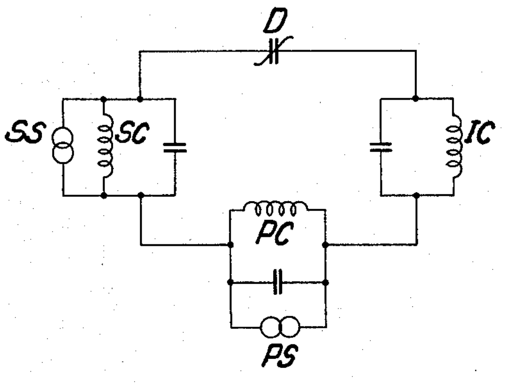
Fig.1 PRIOR ART
FIGURE 1 is a simplified circuit diagram of a known parametric amplifier which has been discussed above.
Figure 8:
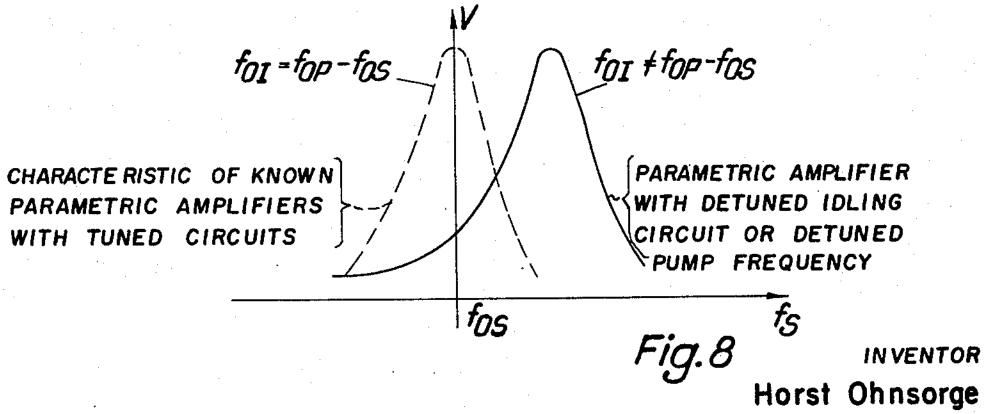
FIGURE 8 is another band-pass curve of another specially tuned parametric amplifier.

A slight deviation from the equation $f_{OI}=f_{OP}-f_{OS}$ results in a gain of bandwidth even in a simple known parametric amplifier as shown, for example, in FIGURE 1. In this case, a band filter characteristic as shown in FIGURE 8 is obtained. Moreover, it has been found that such a parametric amplifier as well as the parametric amplifier according to the invention have increased stability as compared to an amplifier whose circuits satisfy the relationship $f_{OI}=f_{OP}-f_{OS}$. Under certain circumstances, signal circuits and pump circuits do not have to be specially provided since, under certain circumstances, signal sources and pump voltage sources contain frequency selective means at the output.

Instead of the diodes, used as a nonlinear reactances in the embodiments, nonlinear inductances, such as ferrites, may be used.

It will be understood that the above description of the present invention is susceptible to various modifications, changes, and adaptations, and the same are intended to be comprehended within the meaning and range of equivalents of the appended claims.

What is claimed is:

1. A parametric amplifier, comprising, in combination: a signal circuit; a plurality of additional circuits each being connected in parallel with said signal circuit and each including a nonlinear reactance and a resonant idling circuit; and means for feeding at least one pump frequency to said circuits.

2. A parametric amplifier as defined in claim 1 wherein said feeding means include a resonant pump circuit for feeding the pump energy and connected in series with said signal circuit.

3. A parametric amplifier as defined in claim 1 wherein said feeding means includes a plurality of resonant pump circuits for feeding the pump energy, said pump circuits being connected in series with the reactances and idling circuits of said additional circuits, respectively.

4. A parametric amplifier according to claim 3 wherein said feeding means includes a pump signal source; an ohmic resistance for each pump circuit, said pump circuits being connected to said signal source via said resistances.

5. A parametric amplifier as defined in claim 1, wherein each of said idling circuits has band-pass frequencies and each of said idling circuits is arranged so that such frequencies are staggered with respect to the band-pass frequencies of the other idling circuits so that such frequencies partially overlap.

6. A parametric amplifier as defined in claim 1, wherein said feeding means includes a plurality of pump circuits, each of said pump circuits having band-pass frequencies and being arranged so that such frequencies are staggered with respect to the band-pass frequencies of the other pump circuits so that such frequencies partially overlap.

7. A parametric amplifier according to claim 6, wherein said feeding means further includes pump sources arranged so that the frequencies thereof are staggered relative to one another in such a manner that the band-pass curves partially overlap.

8. A parametric amplifier as defined in claim 1, wherein multiple terminal selective networks having band-pass characteristics constitute said signal circuits and said idling circuits.

9. A parametric amplifier as defined in claim 8, wherein said networks have two terminals.

10. A parametric amplifier as defined in claim 8, wherein said networks have four terminals.

11. A parametric amplifier, comprising, in combination: a signal selective network; a plurality of other selective networks in parallel with the signal network for increasing amplification, each other selective network comprising one nonlinear reactance and one idling selective network; and means for feeding at least one pump frequency to said networks.

12. A parametric amplifier, comprising, in combination: a signal resonant circuit; a plurality of additional circuits each connected in parallel with said signal circuit and each including a nonlinear reactance and an idler parallel resonant circuit; and a pump parallel resonant circuit connected to feed a pump resonant frequency to said circuits which frequency is higher than the signal resonant frequency.

13. An amplifier as defined in claim 12 wherein at least one of said idler circuits is tuned so its resonant frequency equals the pump resonant frequency less the signal resonant frequency and at least one of said idler circuits is slightly detuned with respect to the above relationship.

14. An amplifier as defined in claim 13 wherein a plurality of idler circuits are slightly detuned to different frequencies.

15. A parametric amplifier, comprising, in combination: a single signal resonant circuit; a plurality of additional circuits each connected in parallel with said signal circuit and each including a nonlinear reactance and an idler parallel resonant circuit; and a pump parallel resonant circuit connected to feed a pump resonant frequency to said circuits which frequency is higher than the signal resonant frequency, at least one of said idler circuits being tuned so its resonant frequency equals the pump resonant frequency less the signal resonant frequency and at least one of said idler circuits being slightly detuned with respect to the above relationship.

References Cited in the file of this patent

UNITED STATES PATENTS

| | | |
|---|---|---|
| 3,040,267 | Seidel | June 19, 1962 |
| 3,042,867 | Thompson | July 3, 1962 |
| 3,045,189 | Englebrecht | July 17, 1962 |
| 3,070,751 | Vigiano | Dec. 25, 1962 |
| 3,076,149 | Knechtli | Jan. 29, 1963 |

FOREIGN PATENTS

| | | |
|---|---|---|
| 1,081,515 | Germany | May 12, 1960 |
| 1,238,790 | France | July 11, 1960 |

OTHER REFERENCES

Wigington: "Proceedings of the IRE," April 1959, pages 516–523 (pages 516–518 particularly).

Kibler: "Proceedings of the IRE," April 1959, pages 583–584.

Salzberg et al.: "Proceedings of the IRE," June 1958, page 1303.

Chirlian: "Proceedings of the IRE," June 1960, page 1156.